Sept. 12, 1939.   W. BISHIR   2,172,786
ATTACHMENT FOR LAWN MOWERS
Filed Dec. 16, 1937   2 Sheets-Sheet 2
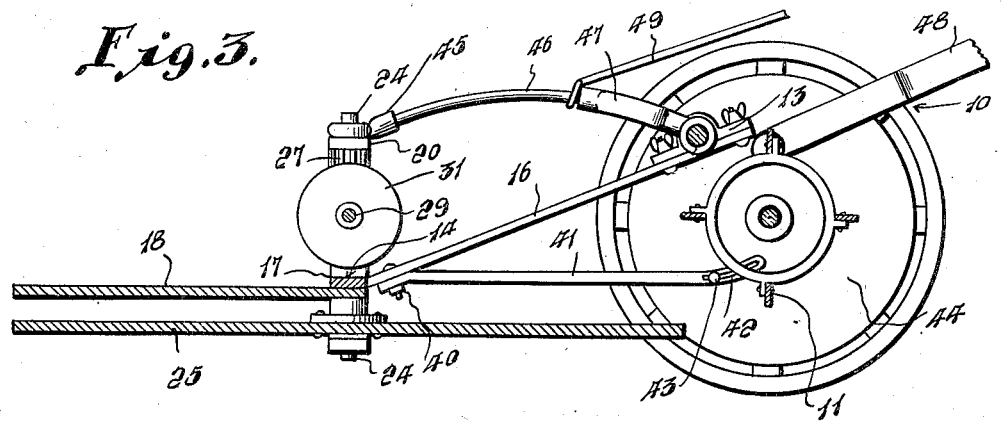
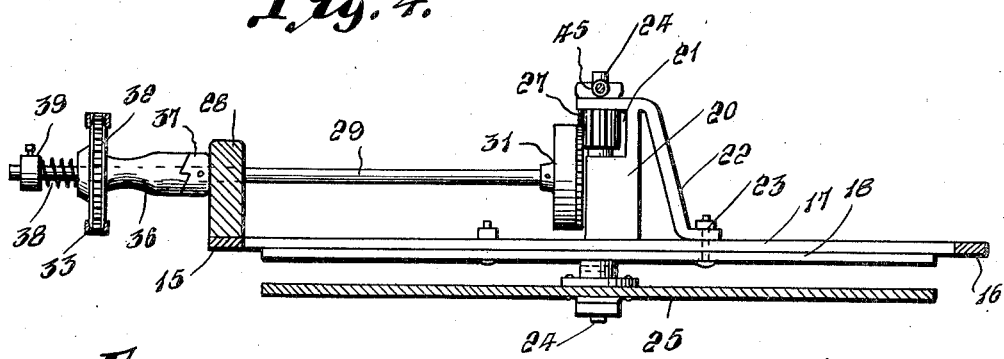
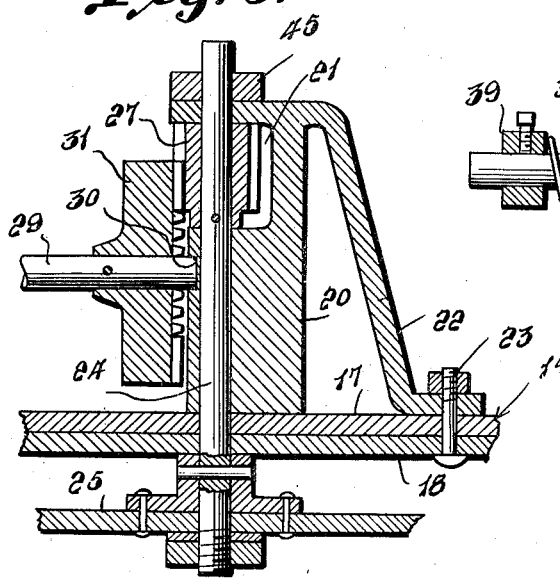
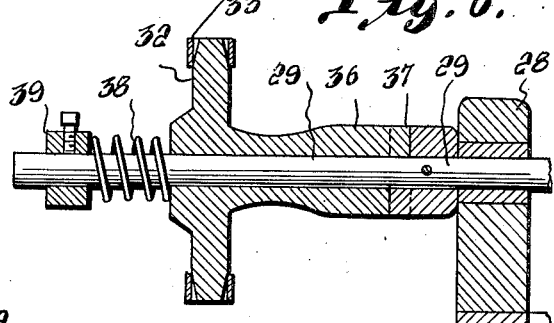
Inventor
Walter Bishir
By L. F. Randolph
Attorney Patented Sept. 12, 1939

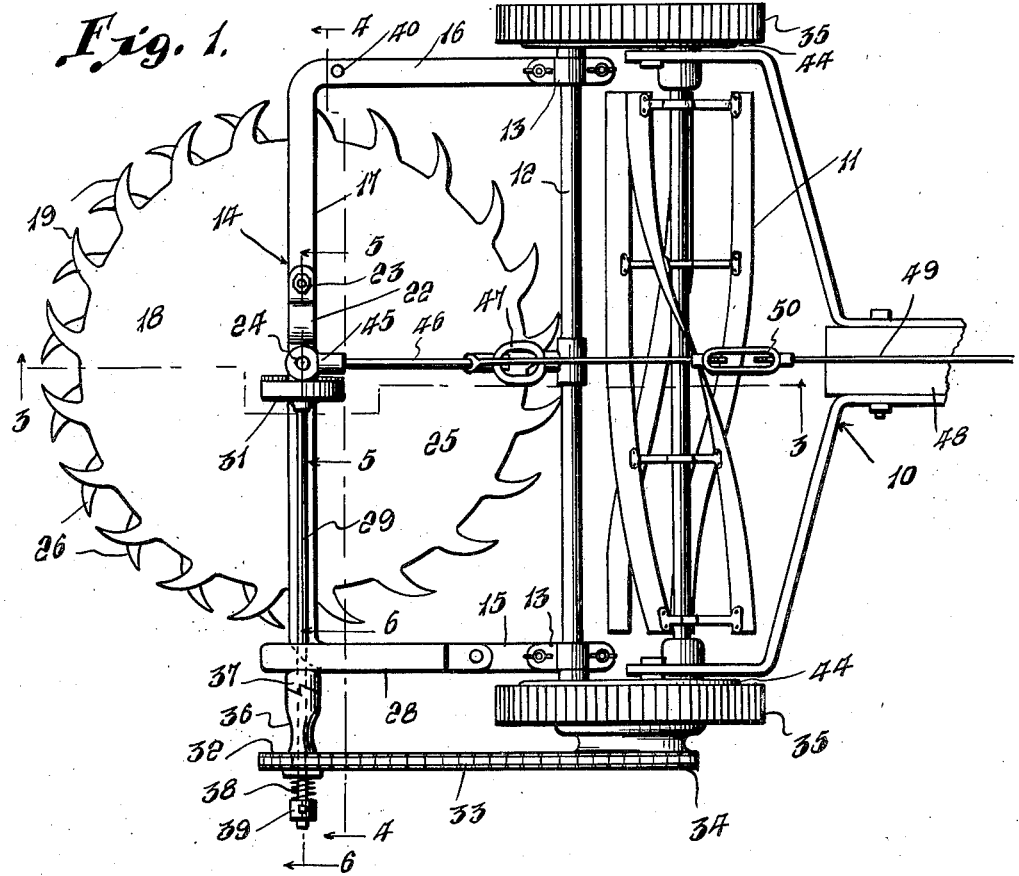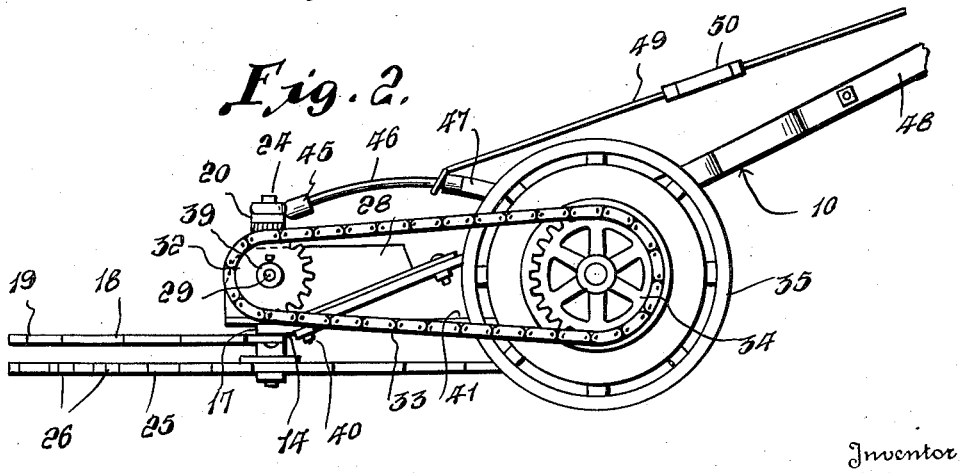

2,172,786

UNITED STATES PATENT OFFICE 2,172,786

ATTACHMENT FOR LAWN MOWERS

Walter Bishir, Gibson City, Ill.

Application December 16, 1937, Serial No. 180,222

5 Claims. (Cl. 56—238)

This invention relates to a weed cutting attachment for use with lawn mowers.

An important object of this invention is to provide an attachment for conventional lawn mowers supported in front of and connected to the lawn mower to operate simultaneously therewith to cut weeds which would otherwise clog or pass under the conventional mower cutter.

Another object of the invention is to provide a weed cutting attachment for lawn mowers comprising a cutter disposed in front of a conventional mower and adjustably positioned to cut-off tall grass and weeds to a height that the conventional cutter can engage them without being clogged thereby.

This invention eliminates the necessity of cutting tall grass and weeds with a sickle or the like before using a lawn mower, by providing a cutting attachment mounted in front of the lawn mower and adapted to cut-off the high grass and weeds sufficiently so that they can be cut by the conventional cutter of the mower.

High grass and weeds will be knocked down by a conventional mower, especially of the reel type, so that they either pass under the mower or clog the cutter. Frequently the tall grass and weeds will lift the mower wheels off of the ground so that the mower slides on the weeds and tall grass and the cutter no longer can operate.

This invention is intended to be positioned at a sufficient height to contact and cut only tall grass and weeds so that the weeds and grass will be sufficiently short when reaching the conventional cutter to be engaged thereby.

Other objects and advantages of the invention will hereinafter become more fully apparent from the following specification of which the drawings form a part, and wherein:

Figure 1 is a top plan view of the invention shown attached to a conventional reel type lawn mower, Figure 2 is a side elevational view of the same, Figure 3 is a vertical sectional view on the line 3—3 of Figure 1, Figure 4 is a vertical sectional vew on the line 4—4 of Figure 1, Figure 5 is a vertical sectional view on the line 5—5 of Figure 1, and Figure 6 is a vertical sectional view on the line 6—6 of Figure 1.

Referring more particularly to the drawings wherein like reference characters indicate like or corresponding parts throughout the different views, 10 designates generally a conventional lawn mower equipped with a conventional reel type cutter 11. Mounted on the guard rod 12 of the mower 10 by means of clamping members 13 is a frame 14 which projects in front of the mower 10 and which includes the downwardly inclined arms 15 and 16 supporting the laterally disposed portion 17. Secured to portion 17 and projecting outwardly thereof is a semi-circular blade 18 having outwardly projecting cutting teeth 19.

Mounted on portion 17 is a bearing 20 having a recess 21 and a diagonally depending arm 22 which is bolted to portion 17 at 23. Journaled in bearing 20, member 18 and portion 17 is a shaft 24 on the lower end of which is secured a disk type blade 25 provided with teeth 26 projecting outwardly from its periphery. Keyed to shaft 24 and mounted in recess 21 is a pinion 27.

Mounted on arm 15 is a bearing 28 in which is journaled a shaft 29, one end 30 of which is journaled in a recess in the side of bearing 20. Mounted on shaft 29 adjacent end 30 is a crown gear 31 the teeth of which mesh with pinion 27. Mounted adjacent the opposite end of shaft 29 is a sprocket 32 over which is trained an endless chain 33 which is also trained over sprocket 34 secured to the outer side of one of the mower wheels 35.

Sprocket 32 is secured to one-half of a clutch 36, the opposite half of which is keyed to shaft 29. The abutting portions of these halves are provided with abutting shoulders and abutting cam surfaces as indicated at 37. Mounted on shaft 29 on the outside of clutch 36 is a coil spring 38 held under tension by the adjustable lock washer 39. When wheels 35 rotate to move mower 10 forwardly the shoulders indicated at 37 will abut, and be so held by spring 38, to connect sprocket 32 and shaft 29. When wheels 35 rotate in the opposite direction the cam surfaces will engage each other and compress spring 38 freeing shaft 29 from sprocket 32 so that the sprocket can turn independently of the shaft.

Bolted to arms 15 and 16 at 40 are the braces 41 provided with the slots 42 by which they are adjustably clamped by bolts 43 to drums 44 of the wheels 35 as best seen in Figure 3. The upper end of shaft 24 is journaled in an eye-socket 45 in which is secured the threaded rod 46 which adjustably connects with a turnbuckle 47 secured to rod 12 to brace the center part of frame 14. Secured to rod 46 and to the upper end of the handle 48, not shown, is a brace 49 provided with a turnbuckle adjustment 50.

Frame 14 supports blades 18 and 25 in a horizontal position in front of mower 10 with blade 18 directly above the front half of blade 25.

Teeth 19 and 26, as best seen in Figure 1, curve in opposite directions and are sharpened on their inner sides to co-act in cutting high grass and weeds in front of the reel 11. The blades 18 and 25 are elevated, as indicated in Figure 2, to pass over the short grass and to cut high grass and weeds off to a height at which the reel 11 can readily engage them.

From the foregoing it will be obvious that as the mower 10 moves forward the wheel 35 secured to sprocket 34 will move chain 33 to turn sprocket 32 and shaft 29 as heretofore explained. Gear 31 keyed to shaft 29 will turn pinion 27 to turn shaft 24 and blade 25. Blade 25 will turn beneath blade 18 so that teeth 19 and 26 will co-act to cut the tall grass and weeds in front of the reel 11. When mower 10 is backed, clutch 36 will release shaft 29, as heretofore explained, to prevent blade 25 from turning backwards.

Braces 41, 46 and 49 can be adjusted, as heretofore pointed out, to raise or lower blades 18 and 25 and in adjusted position provide a firm support for the remote portion of frame 14 which carries the cutting blades.

The attachment disclosed could be used with other well known types of lawn mowers, the reel type as disclosed being the most common type is used to illustrate the application of the invention. Various modifications and changes may be resorted to without departing from the spirit and scope of the invention as hereinafter claimed.

I claim as my invention:

1. An attachment for lawn mowers comprising a U-shaped frame having clamping means at its ends adapted to engage a lawn mower guard rod to position the intermediate portion of the frame in front thereof, a shaft journaled in said frame, a cutter blade mounted on the lower end of said shaft, a stationary blade mounted on the frame to coact with said first mentioned blade, a pinion keyed to said shaft, a shaft journaled laterally of said frame, a gear keyed to said last mentioned shaft and meshing with said pinion, a sprocket wheel keyed to said last mentioned shaft, a sprocket wheel adapted to be secured to a wheel of the lawn mower, and a chain connecting said sprockets to cause said first mentioned blade to revolve when the lawn mower is operated.

2. An attachment for use with wheel supported lawn mowers, said attachment comprising a frame having clamping members at corresponding ends thereof adapted to be adjustably attached to a cross bar of a lawn mower to position the frame in front thereof, a vertically disposed shaft journaled in said frame, a rotary blade secured to said shaft and disposed substantially at right angles thereto, driving means connecting said shaft to a wheel of the lawn mower, and a stationary semi-circular blade secured to said frame and disposed above and contiguous with the leading half of said rotary blade, said stationary blade coacting with the rotary blade for cutting when actuated by the movement of the lawn mower.

3. An attachment for use with wheel supported lawn mowers, said attachment comprising a frame having clamping members at corresponding ends thereof adapted to be adjustably connected to a cross bar of a lawn mower to position the frame in front thereof, a semi-disk shape blade rigidly secured to said frame and provided with arcuately shaped outwardly projecting teeth in its rounded side, a rotary blade, mounted on a shaft journaled in said frame, and disposed beneath said stationary blade and provided with corresponding outwardly extending teeth projecting in the oposite direction to said first mentioned teeth, the leading half of said rotary blade being disposed beneath and contiguously with said stationary blade, a shaft journaled in said frame and disposed at right angles to said first mentioned shaft, gears connecting the adjacent ends of said shafts, and driving means adapted to connect said last mentioned shaft to a wheel of the lawn mower, to be actuated by the forward movement of the lawn mower to revolve the rotary blade to coact with said stationary blade for cutting.

4. An attachment for use with wheel supported lawn mowers, said attachment comprising a rotary blade, a stationary blade mounted to co-act therewith, a shaft keyed to said rotary blade and provided with a pinion, a shaft provided at one end with a gear to mesh with said pinion, means adapted to connect said last mentioned shaft to a wheel of a lawn mower for revolving the rotary blade, said means including a sprocket wheel loosely mounted on said last mentioned shaft, and a clutch including a sleeve section carried by said sprocket wheel and a section keyed to said last mentioned shaft, said sections having interengaging teeth for connecting said sprocket wheel and last mentioned shaft for driving the rotary blade in one direction, said teeth being disengaged by movement of the sprocket wheel in the opposite direction.

5. An attachment for use with lawn mowers, said attachment comprising a U-shaped frame having clamping members at its ends, adapted to engage a lawn mower to position the intermediate portion of the frame in front of the lawn mower, a semi-circular blade fixed to said intermediate portion and having its rounded edge extending forwardly therefrom, said rounded edge having outwardly projecting teeth, and a rotary blade having a shaft journaled in said frame, the leading half of said rotary blade being disposed beneath and contiguous with the fixed blade, said rotary blade having teeth to co-act with the teeth of the fixed blade.

WALTER BISHIR.